(12) United States Patent
Nakatsugawa

(10) Patent No.: US 8,351,458 B2
(45) Date of Patent: Jan. 8, 2013

(54) METHOD FOR ALLOCATING RADIO RESOURCES, RADIO BASE STATION, AND MOBILE STATION

(75) Inventor: Keiichi Nakatsugawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 12/400,101

(22) Filed: Mar. 9, 2009

(65) Prior Publication Data

US 2009/0238130 A1    Sep. 24, 2009

(30) Foreign Application Priority Data

Mar. 18, 2008   (JP) .................................. 2008-070227

(51) Int. Cl.
*H04L 12/42* (2006.01)
*H04J 3/16* (2006.01)

(52) U.S. Cl. ........................................ 370/449; 370/468

(58) Field of Classification Search .................. 370/328, 370/329, 449, 468, 458, 461, 337, 229, 347, 370/395.21, 462, 352, 465, 400; 455/452.1, 455/451, 453, 450
See application file for complete search history.

(56) References Cited

U.S. PATENT DOCUMENTS

| | | | | |
|---|---|---|---|---|
| 5,896,561 | A * | 4/1999 | Schrader et al. | 455/67.11 |
| 6,400,726 | B1 | 6/2002 | Piret et al. | |
| 7,460,514 | B2 * | 12/2008 | Ganz et al. | 370/346 |
| 7,751,437 | B2 * | 7/2010 | Spinar et al. | 370/468 |
| 2003/0125087 | A1 | 7/2003 | Shimizu | |
| 2006/0039319 | A1 | 2/2006 | Lee et al. | |
| 2006/0245352 | A1 * | 11/2006 | Kang et al. | 370/229 |

FOREIGN PATENT DOCUMENTS

| | | |
|---|---|---|
| JP | 6-112876 | 4/1994 |
| JP | 10-240659 | 9/1998 |
| JP | 2003-198564 | 7/2003 |
| WO | 2006019267 | 2/2006 |

OTHER PUBLICATIONS

"IEEE Std. 802.16, Part 16: Air Interface for Fixed Broadband Wireless Access Systems" IEEE Computer Society and the IEEE Microwave Theory and Techniques Society, Oct. 1, 2004.

"IEEE Std. 802.16e, Part 16: Air Interface for Fixed and Mobile Broadband Wireless Access Systems, Amendment 2: Physical and Medium Access Control Layers for Combined Fixed and Mobile Operation in Licensed Bands and Corrigendum 1" IEEE Computer Society and the IEEE Microwave Theory and Techniques Society, Feb. 28, 2006.

Notice of Reasons for Refusal dated May 8, 2012, from the corresponding Japanese Application No. 2008-070227 with partial English-language translation.

* cited by examiner

*Primary Examiner* — Hanh N Nguyen

(74) *Attorney, Agent, or Firm* — Katten Muchin Rosenman LLP

(57) ABSTRACT

A method for allocating uplink radio resources to a radio communication device includes transmitting a polling signal; allocating radio resources for data transmission based on a response signal to the polling signal; suspending transmission of the polling signal when it is determined that a condition to omit the transmission of the polling signal is satisfied; and allocating radio resources for data transmission while the transmission of the polling signal is suspended.

15 Claims, 14 Drawing Sheets

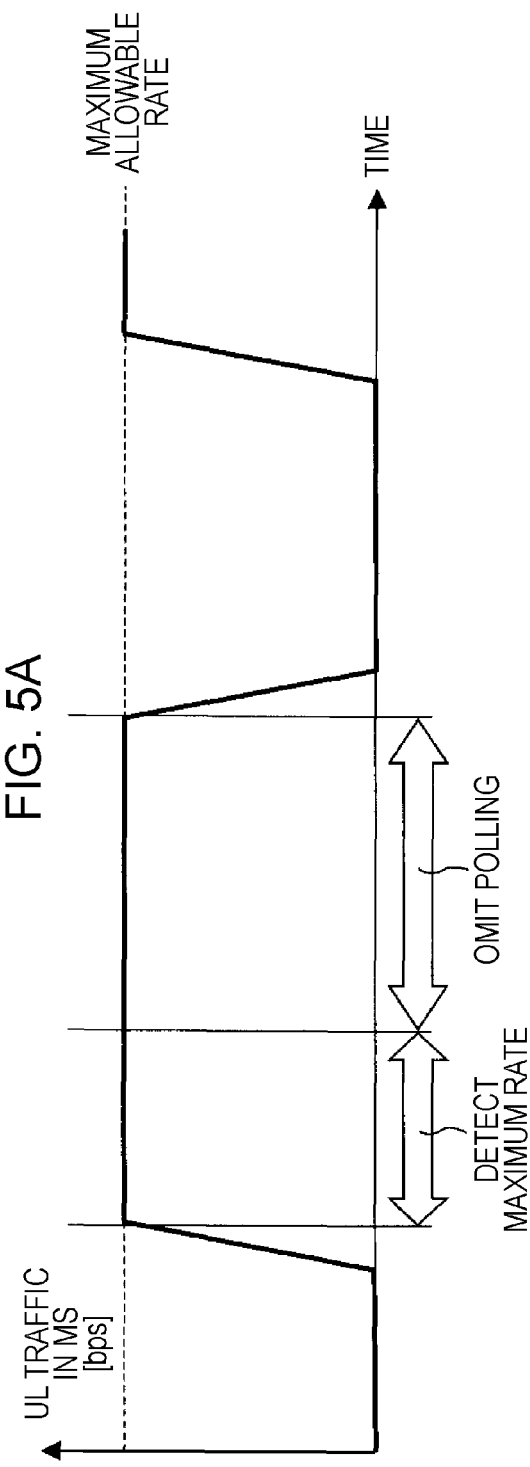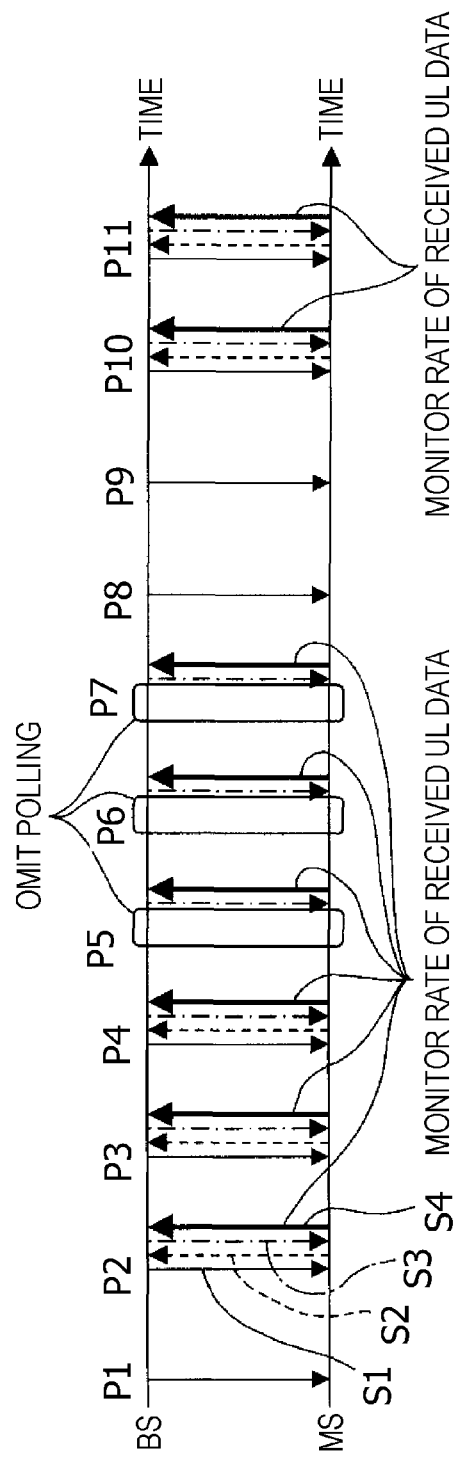

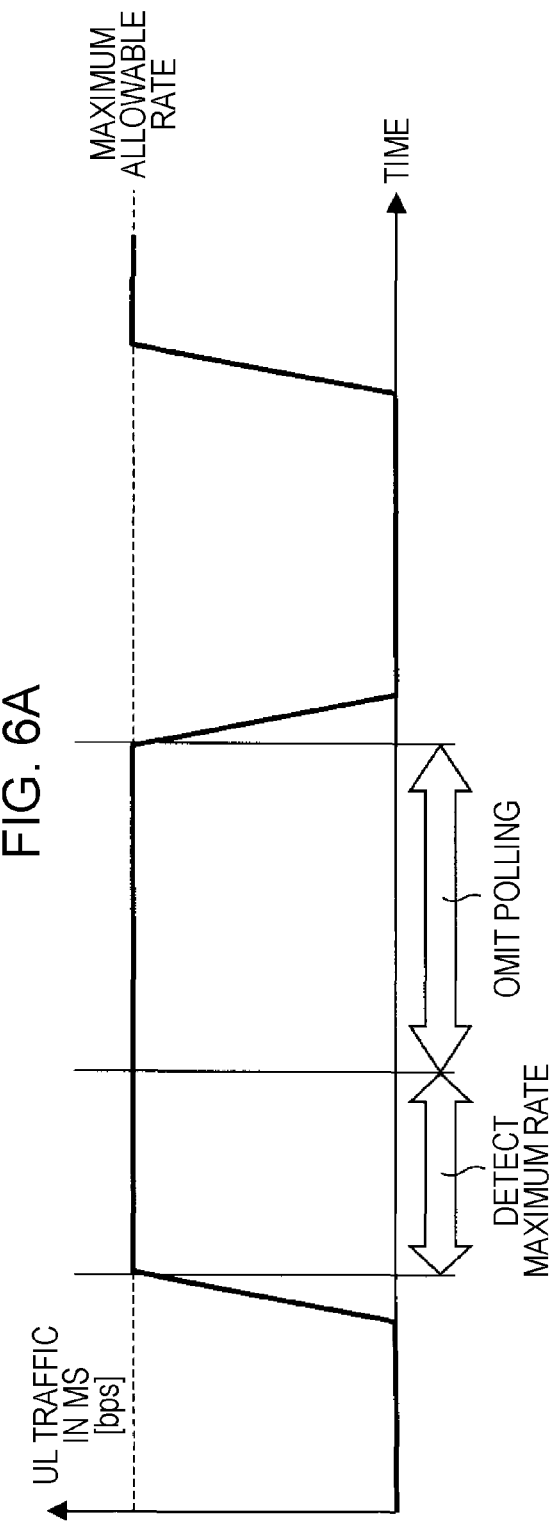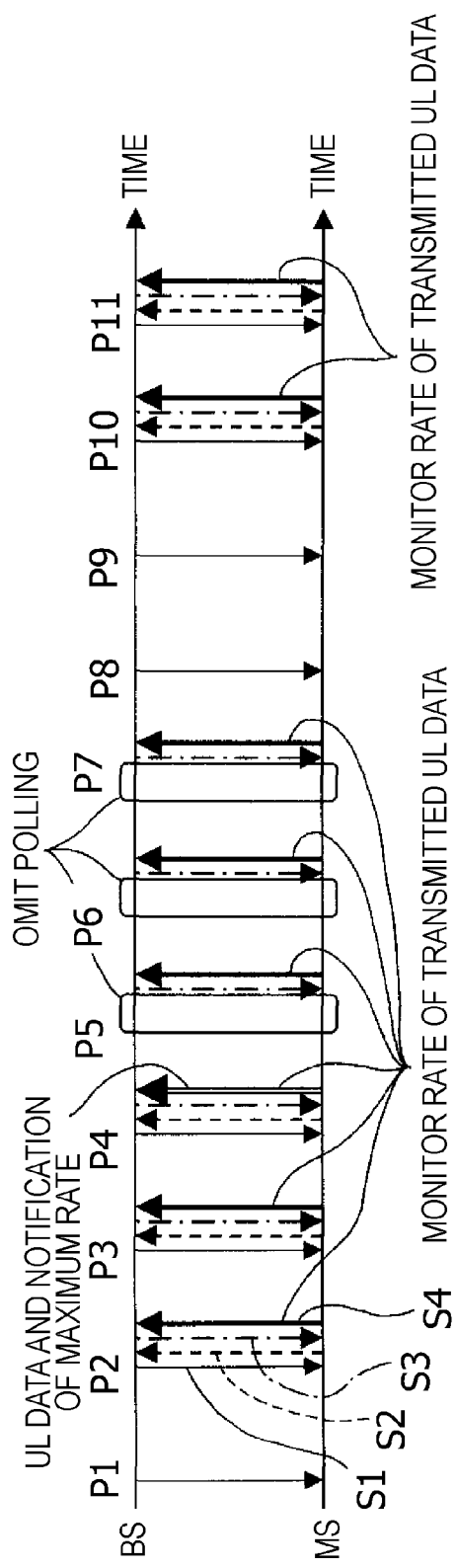

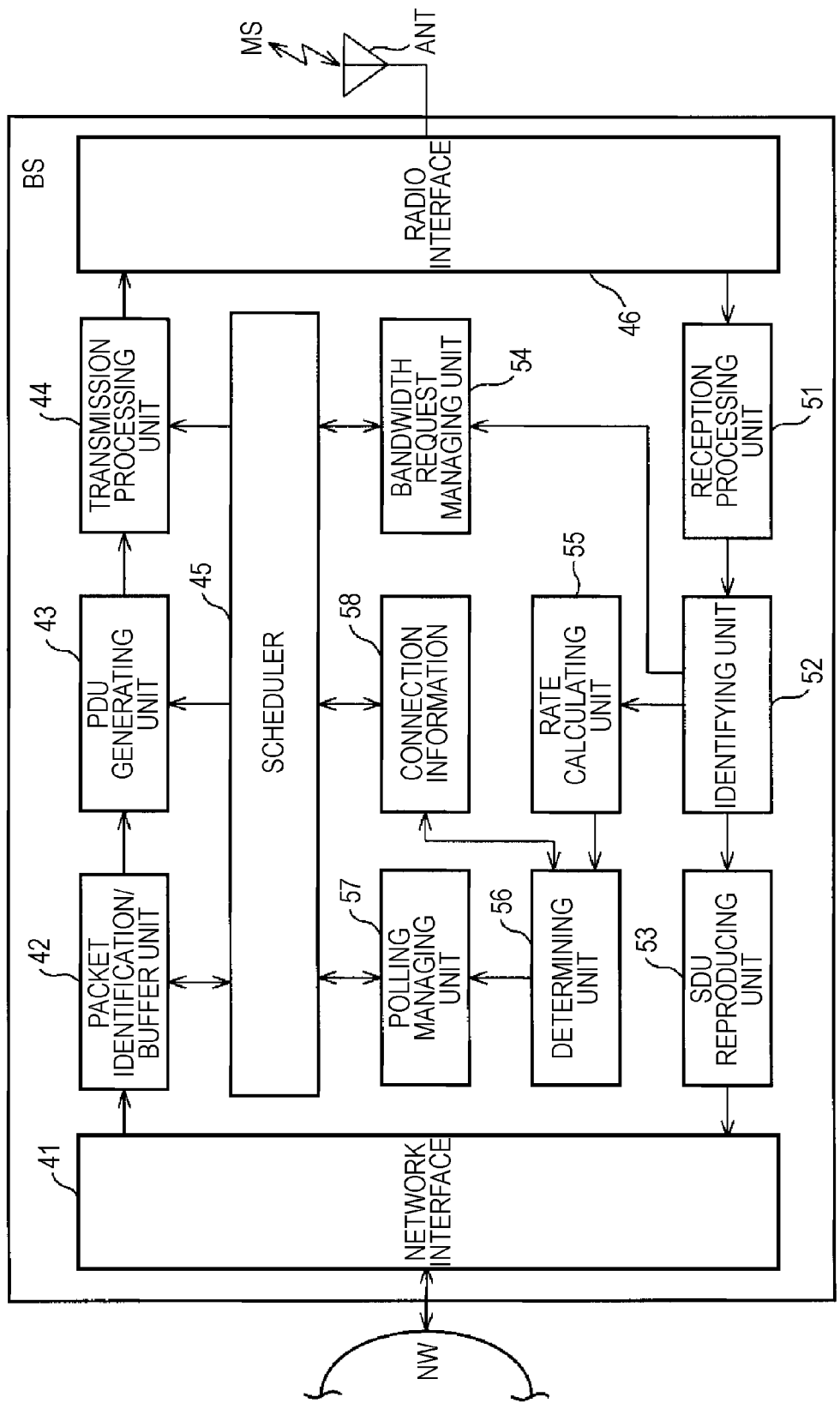

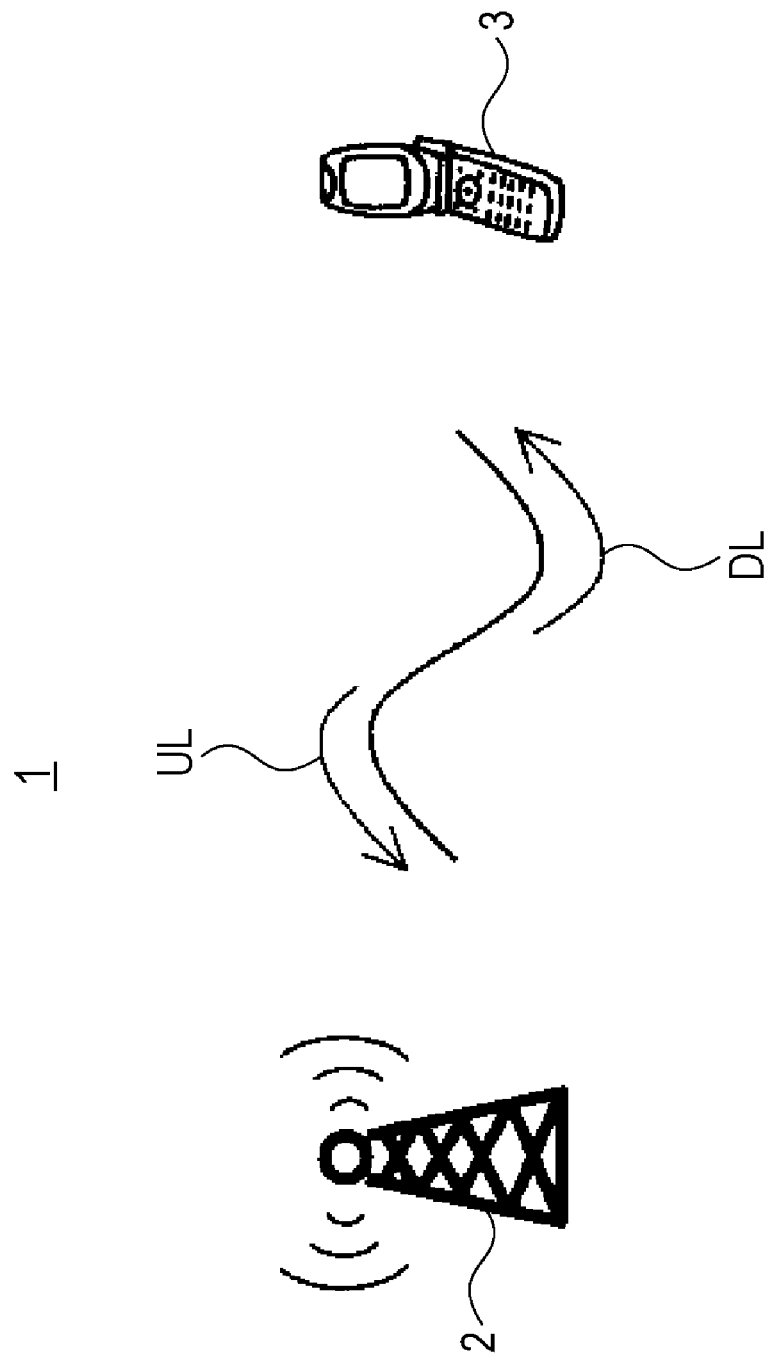

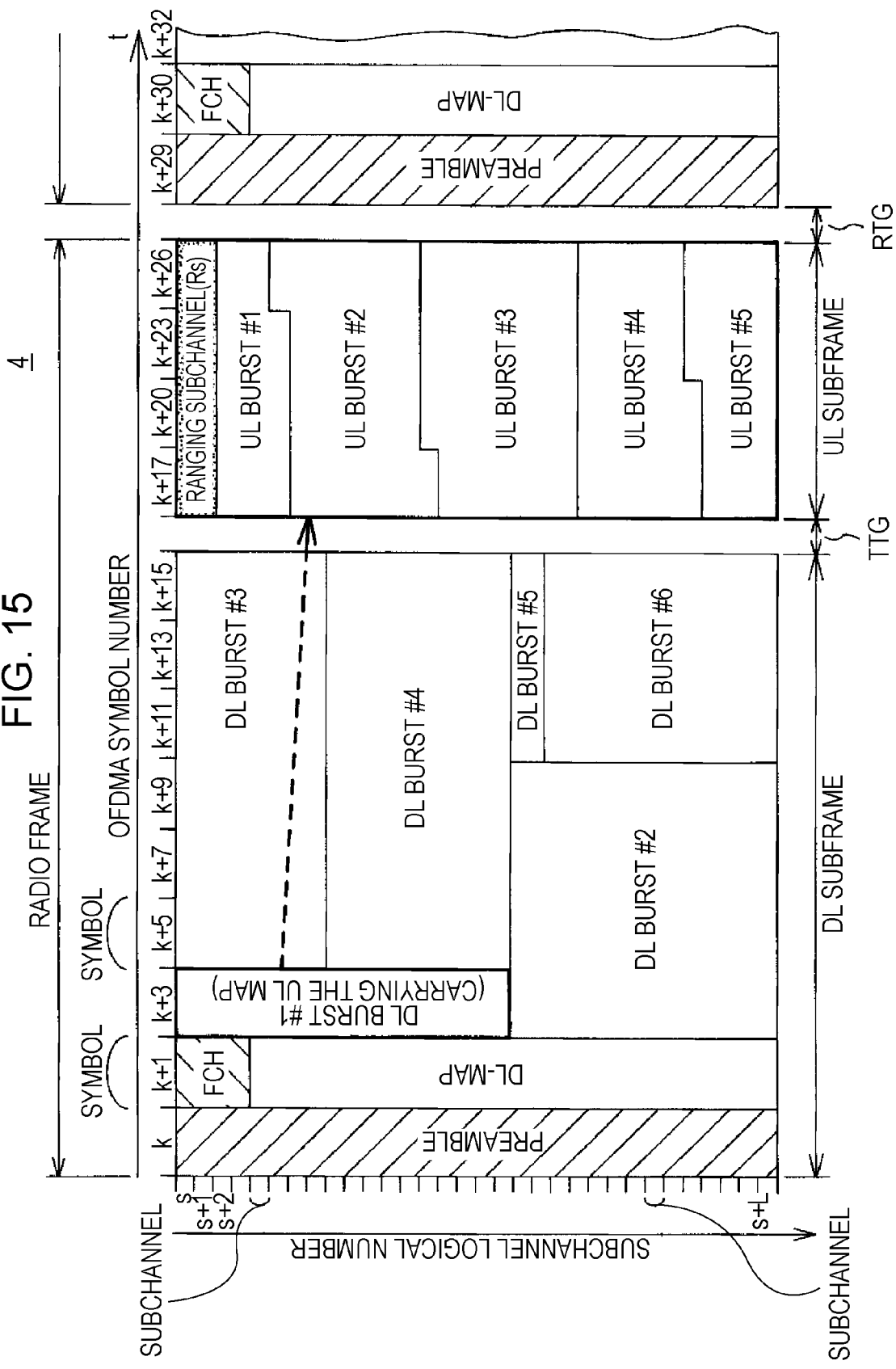

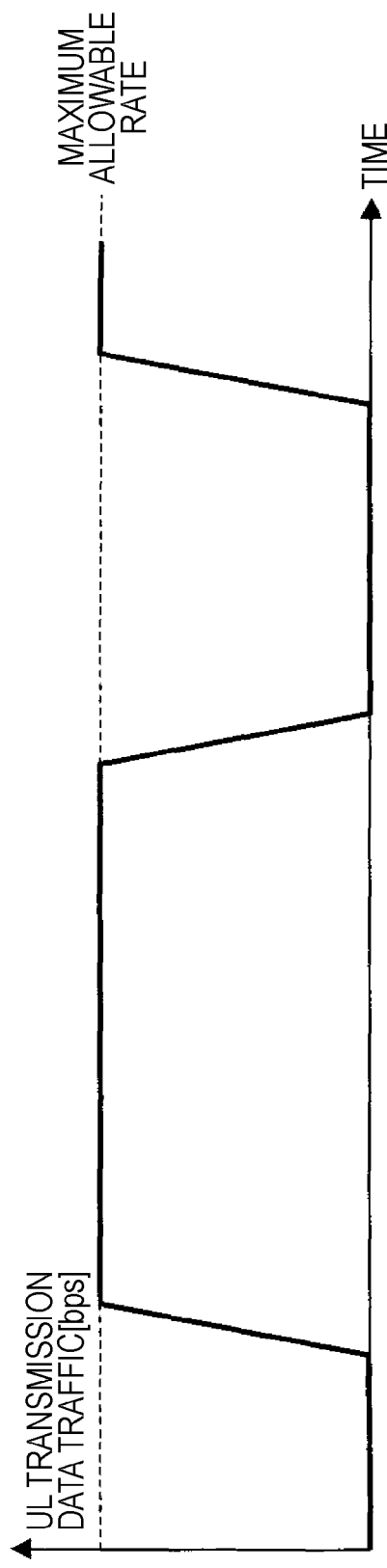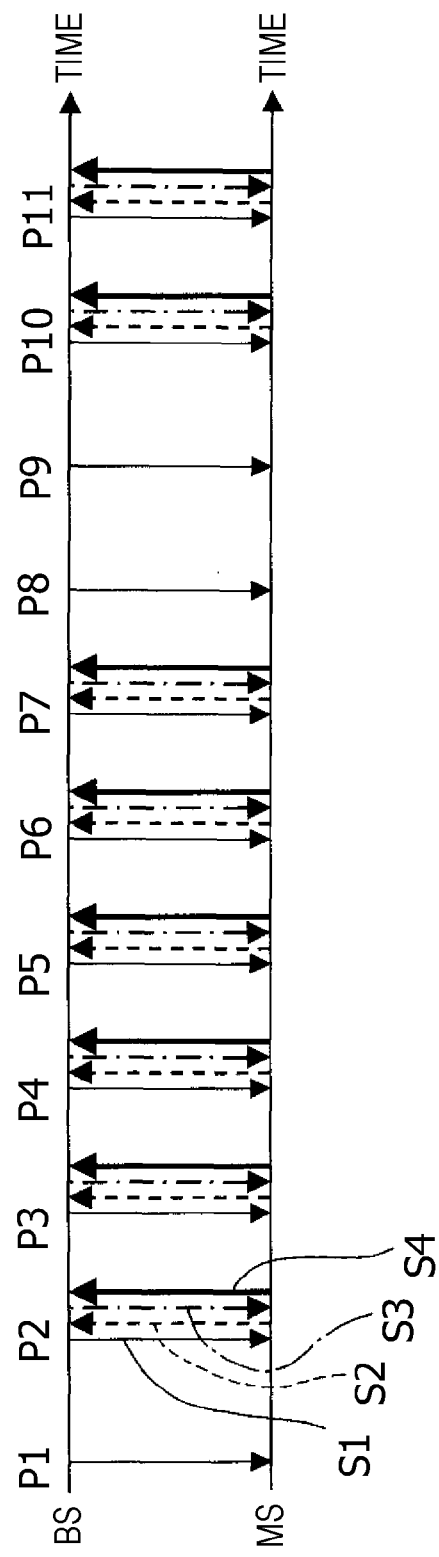

METHOD FOR ALLOCATING RADIO RESOURCES, RADIO BASE STATION, AND MOBILE STATION

CROSS-REFERENCE TO RELATED APPLICATIONS

This application is based upon and claims the benefit of priority of the prior Japanese Patent Application No. 2008-70227, filed on Mar. 18, 2008, the entire contents of which are incorporated herein by reference.

FIELD

Certain aspects of the present invention discussed herein are related to a method for allocating radio resources, a radio base station, and a mobile station.

BACKGROUND

The radio communication system according to IEEE 802.16 standard is known as one of radio communication techniques to allocate radio resources. The IEEE 802.16 defines a technique of establishing a wireless MAN (Metropolitan Area Network) as a wide area network to mutually connect LANs (Local Area Networks) in a metropolitan area or a specific area by wirelessly connecting a communication carrier to user's homes without using telephone lines or optical fiber lines. According to this technique, a single radio base station may cover an area of about 50 km in radius at a transmission rate of about 70 megabits per second at the maximum.

Under current circumstances, standardization of 802.16d specifications (802.16-2004) mainly for fixed communication application and 802.16e specifications (802.16e-2005) for mobile communication application is progressing in the IEEE 802.16 Working Group.

FIG. 14 illustrates an example of a configuration of a conventional radio communication system. The radio communication system 1 in this figure includes a radio base station (BS) 2 and at least one mobile station (MS) 3. Radio signals are mutually transmitted/received therebetween, so that communication in downlink DL (from BS to MS) and uplink UL (from MS to BS) is performed. In the IEEE 802.16e, transmission/reception of the radio signals is performed by using radio frames generated by using OFDMA (Orthogonal Frequency Division Multiplexing Access).

FIG. 15 illustrates an example of a radio frame compatible with the IEEE 802.16e. In the figure, the horizontal axis indicates a time direction expressed in units of symbols, whereas the vertical axis indicates a frequency direction expressed by logical subchannels which are units in which a plurality of subcarriers are grouped. FIG. 15 illustrates an example where TDD (Time Division Duplexing) is used as a method for multiplexing uplink (UL) and downlink (DL). The radio frame 4 includes a DL subframe in the first half and a UL subframe in the second half. The DL subframe includes a preamble (symbol k); FCH (Frame Control Header (symbol k+1): including information such as the length of DL-MAP, encoding method, and the number of repetitions); DL-MAP (indicating an allocation state of bursts (DL bursts #1 to #6 in FIG. 15) on the DL subframe); UL-MAP (showing an allocation state of bursts (Ranging subchannel Rs (symbol k+17 to k+26) and UL bursts #1 to #5 in FIG. 15) on the UL subframe); and DL bursts (store data and message addressed to the MS 3). Here, in the UL subframe, the MS 3 transmits a control message or UL data to the BS 2 by using a certain area such as the Ranging subchannel Rs or an UL burst based on the mapping illustrated in the UL-MAP (see broken-line right arrow in FIG. 15).

As is clear from FIG. 15, in the IEEE 802.16e, every UL communication from the MS 3 is performed based on the UL-MAP generated by the BS 2. Thus, in the IEEE 802.16e, several scheduling types are defined as a communication control method for allowing the MS 3 to receive allocation of a UL burst for UL data transmission from the BS 2.

FIGS. 16A and 16B illustrate states of occurrence of UL data in the MS 3 and transmission control between the BS 2 and the MS 3. Various applications of Web, audio, video, etc. are executed in the MS 3. Here, assume a variable-data-rate-type application having high real-time performance of data and having temporal variations in the amount of data occurred, as in a voice or TV conference in which "silence compression" is performed.

In a period when UL data occurs, the BS 2 needs to allocate a UL burst for transmitting the UL data to the MS 3. On the other hand, in a period when no UL data occurs, there is no need to allocate a UL burst. In an ordinary case, a period when data occurs is independent in every application of the MS 3. Thus, in a period when no UL data occurs in an MS, radio resources are allocated to another MS in which UL data occurs, so that the usage efficiency of the radio resources may be enhanced and a UL throughput in the entire BS 2 may be enhanced.

As described above, in order to efficiently use the radio resources, it is necessary to dynamically and quickly recognize the necessity of allocation of a UL burst and reflect the recognition on the scheduling in the BS 2 in accordance with presence/absence of UL data in the MS 3. As a communication control method suitable for UL connection having such a real-time variable-rate-type traffic characteristic, a scheduling type called "rtPS (real-time polling service)" is defined in the IEEE 802.16e.

FIG. 16B illustrates a sequence of UL transmission control using the above-described rtPS between the BS 2 and the MS 3. In the rtPS, polling is regularly performed from the BS 2 to the MS 3. Here, polling in the IEEE 802.16e means allocation by the MS 3 to the BS 2 of a UL burst having a size (6 bytes) necessary to transmit a BR (Bandwidth Request) message to make a UL burst allocation request. Each of the UL burst allocated as polling and the UL burst allocated to transmit UL data of an application is constituted by a slot area on the UL subframe specified by the UL-MAP as illustrated in FIG. 15, although the sizes of those bursts are different from each other.

When polling is performed by the BS 2, if UL data to be transmitted occurs in the MS 3, the MS 3 transmits a BR message to the BS 2 by using the UL burst allocated through the polling so as to notify the BS 2 of the size (in units of bytes) of the UL data to be transmitted from the MS 3.

The BS 2 that has received the BR message selects MSs to which UL bursts are to be allocated and determines the sizes of the bursts to be allocated based on scheduling by a scheduler in view of also BR messages from other MSs.

As a result of the scheduling, the BS 2 generates the above-described UL-MAP and broadcasts the UL-MAP to all the MSs in the DL subframe of the subsequent radio frame 4. Each MS analyzes the UL-MAP received through the broadcast. If a UL burst is allocated to itself (MS), the MS transmits UL data by using the UL burst. This UL burst has a size larger than that of the UL burst used for polling in an ordinary case.

In this way, transmission of UL data in the rtPS is controlled between the BS 2 and the MS 3 in the following four steps S1 to S4.

S1: From BS to MS: Polling (allocation of UL burst for BR message) is executed.
S2: From MS to BS: BR message is transmitted.
S3: From BS to MS: UL burst for data transmission is allocated.
S4: From MS to BS: UL data is transmitted.

In the example illustrated in FIG. 16B, the above-described transmission control including steps S1 to S4 is performed in each of the processes where UL traffic occurs in the MS 3 (P2 to P7, P10, and P11 on the upper side in FIG. 16B) On the other hand, in the processes where no UL traffic occurs (P1, P8, and P9 on the upper side in FIG. 16B), polling in step S1 is performed but the MS 3 does not transmit a BR message to the BS 2 in step S2 because there is no UL data to be transmitted.

In the IEEE 802.16e, negotiations are performed between the BS 2 and the MS 3 about the scheduling type to be used and traffic parameters for scheduling before UL connection is established at the start of communication. For example, in the rtPS, negotiations are performed about the following respective traffic parameters.

Maximum Latency (maximum allowable delay)
Minimum Reserved Traffic Rate (minimum guaranteed rate)
Maximum Sustained Traffic Rate (maximum allowable rate)
Traffic Priority (traffic priority)
Request/Transmission Policy (attribute/policy about BR and transmitting process)
Unsolicited Polling Interval (polling interval)

The BS 2 performs scheduling an allocation of a UL burst for connection of the MS 3. The interval of polling is defined by "Unsolicited Polling Interval". "Minimum Reserved Traffic Rate" and "Maximum Sustained Traffic Rate" are parameters about a transmission rate of UL data. The BS 2 controls allocation of UL bursts so that the traffic rate does not surpass "Maximum Sustained Traffic Rate", which is the maximum allowable rate, while guaranteeing "Minimum Reserved Traffic Rate" on average.

According to the above-described UL communication control method, UL radio resources may be efficiently used by dynamically controlling allocation of a UL burst in accordance with presence/absence of UL data in the MS 3.

However, the inventor has found that the following inefficiency occurs depending on an occurrence state of UL data in the MS 3.

As illustrated in FIGS. 16A and 16B, for example, UL data intermittently occurs in variable-data-rate-type traffic using the rtPS. When UL data occurs, the UL data is continuously transmitted temporarily at the maximum allowable rate defined by the traffic parameter. According to the example illustrated in FIGS. 16A and 16B, UL data is transmitted at the above-described maximum allowable rate in P3 to P7 on the upper side in FIG. 16B.

At this time, polling from the BS 2 to the MS 3 is constantly performed in each of P1 to P11 in FIG. 16B based on the polling interval parameter regardless of presence/absence of UL data. Therefore, the BS 2 constantly performs polling also in processes P3 to P7 on the upper side in FIG. 16B where UL data is transmitted at the maximum allowable rate. In response to this, the MS 3 transmits a BR message at each time so as to request allocation of a UL burst.

However, in the state where transmission of UL data is continued as in processes P3 to P7 on the upper side in FIG. 16B, every response to the polling is the same.

As described above, a UL burst allocated as polling is small in size, but at least occupies radio resources in the UL subframe like a UL burst for normal transmission of UL data. Furthermore, when a UL burst is to be allocated, definition information of the UL burst needs to be added to the UL-MAP by UL-MAP IE. The UL-MAP IE for defining the UL burst is constituted by information including CID (Connection Identifier); UIUC (UL-MAP IE classification); duration (number of slots); and reception coding indication (the number of data repetitions), and has a size of 32 bits (4 bytes). Thus, 10 bytes of radio resources: 4 bytes of UL-MAP IE in the UL-MAP and 6 bytes of UL burst for a BR message, are necessary to perform polling once. In this case, as the polling interval is shorter or as the number of connections is larger, the number of slots used for the polling is larger.

As described above with reference to FIG. 15, both the radio resources for polling and the radio resources for data transmission are in the UL subframe. Therefore, as the amount of radio resources used for polling is larger, the amount of radio resources usable for data transmission is smaller accordingly. In such a case, usage efficiency of UL radio resources for data transmission decreases, which causes a decrease in UL throughput in the entire BS 2.

Such a problem may occur not only in the IEEE 802.16 but also in another radio communication system to perform allocation of radio resources.

SUMMARY

Accordingly, in a certain aspect, the object of the invention is to improve a method for allocating radio resources or efficiently allocate radio resources.

According to a certain aspect of the invention, a method for allocating uplink radio resources to a radio communication device includes transmitting a polling signal; allocating radio resources for data transmission based on a response signal to the polling signal; suspending transmission of the polling signal when it is determined that a condition to omit the transmission of the polling signal is satisfied; and allocating radio resources for data transmission while the transmission of the polling signal is suspended.

According to a certain aspect of the invention, a radio base station is used in a radio communication system that includes the radio base station and a plurality of mobile stations to transmit uplink data to the radio base station by being allocated with radio resources to accommodate data, uplink radio resources being allocated in the radio communication system based on polling from the radio base station and an uplink data transmission request from each of the mobile stations in response to the polling. The radio base station includes a calculating unit to calculate a transmission rate of uplink data received from each of the mobile stations; a determining unit to determine whether the calculated transmission rate is equal to or higher than a maximum allowable rate; and an allocating unit to allocate radio resources for the uplink data when the transmission rate is determined to be equal to or higher than the maximum allowable rate, wherein the allocated radio resources are selected from radio resources including a radio resource obtained by the suspending.

According to a certain aspect of the invention, a radio base station is used in a radio communication system that includes the radio base station and a plurality of mobile stations to transmit uplink data to the radio base station by being allocated with slots to accommodate data, uplink radio resources being allocated in the radio communication system based on polling from the radio base station and an uplink data transmission request from each of the mobile stations in response to the polling. The radio base station includes an information receiving unit to receive rate information that is transmitted from each of the mobile stations when it is determined that a transmission rate of uplink data calculated in the mobile station is equal to or higher than a maximum allowable rate; and an allocating unit to allocate radio resources including a radio resource obtained by suspension of polling to the mobile station when the rate information is received.

According to a certain aspect of the invention, a mobile station is used in a radio communication system including a radio base station and a plurality of mobile stations to transmit uplink data to the radio base station by being allocated with slots to accommodate data, uplink radio resources being allocated in the radio communication system based on polling from the radio base station and an uplink data transmission request from each of the mobile stations in response to the polling. The mobile station includes a calculating unit configured to calculate a transmission rate of uplink data to be transmitted to the radio base station; a determining unit configured to determine whether the calculated transmission rate is equal to or higher than a maximum allowable rate; and a transmitting unit configured to transmit rate information to the radio base station when the calculated transmission rate is determined to be equal to or higher than the maximum allowable rate, wherein the radio terminal is allocated radio resources which is selected from radio resources including a radio resource obtained by suspension of polling to the mobile station, the suspension being started in response to the rate information by the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5A illustrates occurrence of uplink data in the MS according to an embodiment;

FIG. 5B illustrates a state of transmission control between the BS and the MS according to an embodiment;

FIG. 6A illustrates occurrence of uplink data in the MS according to another embodiment;

FIG. 6B illustrates a state of transmission control between the BS and the MS according to another embodiment;

FIG. 7 is a block diagram illustrating a specific example of a configuration of the BS;

FIG. 14 illustrates an example of a configuration of a radio communication system;

FIG. 15 illustrates an example of a radio frame compatible with IEEE 802.16e;

FIG. 16A illustrates occurrence of uplink data in a MS; and

FIG. 16B illustrates a state of transmission control between a BS and MS.

DESCRIPTION OF EMBODIMENTS

Embodiments for carrying out the present invention are described with reference to the figures.

According to a certain aspect an embodiment, a method for allocating radio resources to a radio communication device includes (i) performing transmission of a polling signal and allocating radio resources for data transmission in accordance with a response signal to the polling signal; and (ii) suspending the transmission of the polling signal and allocating the radio resources for data transmission if it is determined that a condition to omit the transmission of the polling signal is satisfied.

According to a certain aspect of an embodiment, there is provided a radio communication system that includes a radio base station and a plurality of mobile stations to transmit uplink data to the radio base station by being allocated with radio resources to accommodate data. Uplink radio resources are allocated in the radio communication system based on polling from the radio base station and an uplink data transmission request from each of the mobile stations in response to the polling. The radio communication system includes a process of monitoring uplink data, particularly a transmission rate of the uplink data from each of the mobile stations to the radio base station; a process of determining whether the transmission rate is equal to or higher than a predetermined rate; and a process of allocating radio resources for transmitting the uplink data, wherein the allocated radio resources are selected from radio resources including a radio resource obtained by suspension of the polling by suspending the polling if the transmission rate is determined to be equal to or higher than the predetermined rate.

The Polling may be performed by allocating free resources in a radio frame on uplink to enable transmission of a BR (Bandwidth Request) about a request for transmitting uplink data from each mobile station via the uplink and by broadcasting uplink map information (UL-MAP) indicating the allocation to the respective mobile stations by using a radio frame on downlink from the radio base station to the mobile stations.

The mobile station in which an uplink data transmission request occurs transmits the transmission request (BR) by transmitting the BR signal to the radio base station put in the free resources that are regularly provided.

Accordingly, the mobile station may receive allocation of radio resources to transmit the uplink data from the radio base station.

Figure 1:
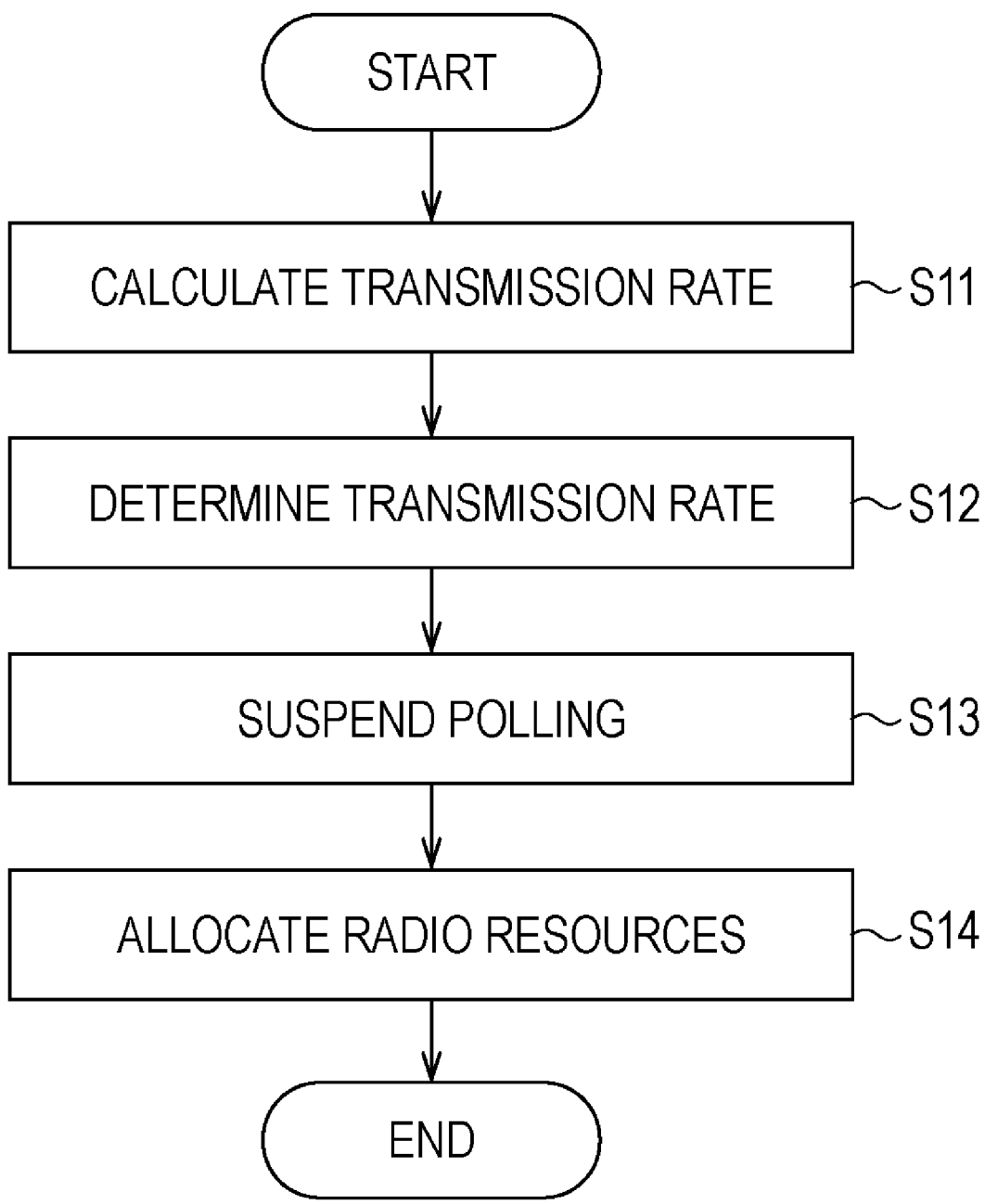
FIG. 1 is a flowchart illustrating a method for allocating uplink radio resources according to an embodiment.

Next, an embodiment is explained by referring to FIG. 1.

In this embodiments, polling is suspended in accordance with a data transmission status in communication control in a radio communication system including a radio base station and at least a mobile station, so as to enhance usage efficiency of radio resources.

In this embodiment, a description is given about communication control in the direction from a mobile station to a radio base station (uplink (UL) direction). However, the embodiment may be applied to a downlink (DL) direction.

A radio base station (BS) 2 performs polling to a mobile station (MS) 3 in order to check a request for data transmission. Based on a UL data transmission request (BR: Bandwidth Request) transmitted from the MS 3 in response to the polling, the BS 2 allocates UL radio resources.

Accordingly, the MS 3 receives allocation of radio resources usable for transmitting data from the BS 2 and transmits UL data to the BS 2 by using the allocated radio resources. Incidentally, a plurality of MSs 3 may exist.

In the embodiments, the following process is performed.

FIG. 1 is a flowchart illustrating a method for allocating UL radio resources according to an embodiment.

Step S11: A transmission status of UL data transmitted from each MS 3 to the BS 2 is checked (e.g., an actual transmission rate is calculated).

Step S12: Whether the transmission status satisfies a predetermined condition is determined. For example, whether the calculated transmission rate is equal to or higher than a predetermined reference rate (e.g., a maximum allowable rate) is determined. Accordingly, it is estimated that a request for allocation of radio resources for data transmission is made by the MS 3 if the polling is continued.

Step S13: If it is determined that the transmission rate is equal to or higher than the predetermined reference rate (e.g., the maximum allowable rate), polling is suspended.

Step S14: Polling is suspended and radio resources for transmitting UL data are continuously allocated to the MS 3. That is, a polling process of inquiring whether allocation of UL radio resources to the MS 3 is necessary is omitted, while it is estimated that allocation of radio resources is necessary. Then, allocation of radio resources is continuously performed.

Such control to allocate radio resources may be the same as control to allocate radio resources that is performed if polling is performed in a polling suspended period and if the MS 3 requests allocation of radio resources in response to the polling.

If the predetermined condition is not satisfied in the above-described determining step S12 (e.g., if the calculated transmission rate is lower than the maximum allowable rate), normal (periodic) polling is performed to the MS 3.

In the above-described steps, steps S13 and S14 may be performed by the BS 2, whereas steps S11 and S12 may be performed by either the BS 2 or the MS 3. Specifically, the process may be performed in the following manner.

(i) The calculating step S11 and the determining step S12 are performed by the BS 2. Alternatively, (ii) the calculating step S11 and the determining step S12 are performed by at least one MS 3, and, if the MS 3 determines that a predetermined polling suspension condition is satisfied (e.g., the calculated transmission rate is equal to or higher than the reference rate (maximum allowable rate)), the MS 3 transmits a notification to suspend polling to the MS 2.

Polling may be suspended immediately after it is determined that the transmission rate is equal to or higher than the reference rate (maximum allowable rate). However, if the above-described allocation of radio resources omitting polling is performed in the case where the possibility that the transmission rate of UL data maintains the reference rate (maximum allowable rate) is high, the possibility of wasteful allocation of radio resources may be reduced.

For example, as described in the following (i) to (iii), a method for applying a hysteresis characteristic to polling suspension control may be adopted.

(i) In the determining step S12, the number of times the transmission rate is equal to or higher than the maximum allowable rate is counted. If it is determined that the number of times has reached a specified number, the suspending step S13 is performed.

(ii) In the allocating step S14, the number of allocations is counted, and the suspending step S13 is performed until the number reaches a specified number.

(iii) In the allocating step S14, the elapsed time from when it is determined in the determining step S12 that that the calculated transmission rate (S11) is equal to or higher than the maximum allowable rate is measured, and the suspending step S13 is performed until the elapsed time reaches a specified (certain) time (T).

By adopting such a condition as the predetermined condition, polling may be suspended in the case where the possibility that the transmission rate of transmission data maintains the reference rate (maximum allowable rate) is high, and the radio resources may be efficiently allocated.

Figure 2:
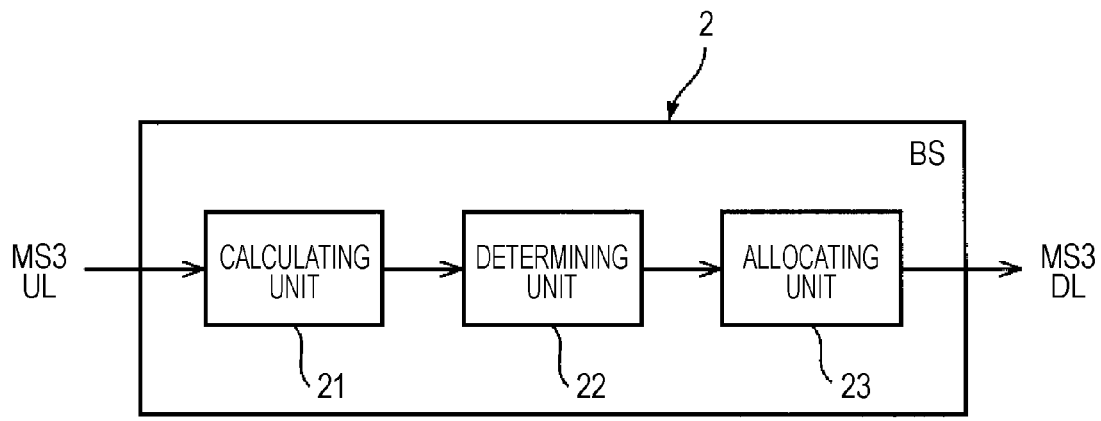
FIG. 2 is a block diagram illustrating a radio base station (BS) according to an embodiment.

Next, the BS 2 is described. FIG. 2 is a block diagram of the BS 2 according to the embodiment. FIG. 2 illustrates the BS 2 in a radio communication system 1 that includes the BS 2 and a plurality of MSs 3 allocated with radio resources to accommodate data and transmitting UL data to the BS 2 by using the allocated radio resources. In the radio communication system 1, allocation of UL radio resources is performed based on polling by the BS 2 and a UL data transmission request (BR) from each MS 3 in response to the polling. As illustrated in FIG. 2, the BS 2 includes a calculating unit 21 to calculate a transmission rate of UL data received from the MS 3, a determining unit 22 to determine whether the calculated transmission rate is equal to or higher than the maximum allowable rate, and an allocating unit 23 to allocate radio resources for UL data by suspending polling and increase radio resources to be allocated to the MS 3 or another mobile station by adding the radio resource corresponding to the suspension of the polling if it is determined that the transmission rate is equal to or higher than the maximum allowable rate.

If the transmission rate calculated by the calculating unit 21 is lower than the maximum allowable rate, the allocating unit 23 performs normal polling to the MS 3.

As described above with reference to FIG. 1, the calculating step S11 and the determining step S12 may be performed on the side of the MS 3. In that case, the BS 2 has the following configuration.

Figure 3:
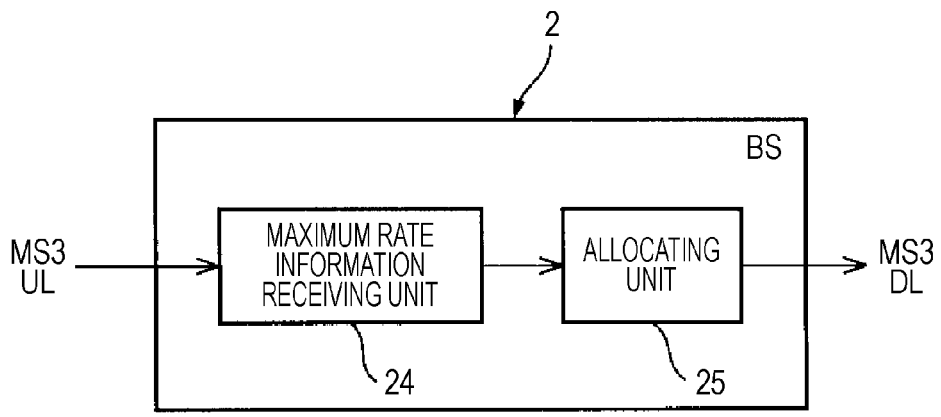
FIG. 3 is a block diagram illustrating a BS according to another embodiment.

FIG. 3 is a block diagram of the BS 2 according to another embodiment. As illustrated in FIG. 3, the BS 2 includes a (maximum) rate information receiving unit 24 to receive (maximum) rate information that is transmitted from the MS 3 after the transmission rate of UL data is calculated in the MS 3 and it is determined that the calculated transmission rate is equal to or higher than the maximum allowable rate, and an allocating unit 25 to allocate radio resources for the UL data by suspending polling and adding the radio resources corresponding to the suspension of the polling to domain of radio resources to be allocated for other data transmission, such as data transmission of the MS 3, upon receiving the maximum rate information.

When being notified that the transmission rate calculated in the MS 3 is equal to or higher than the maximum allowable rate (when receiving a request for allocation of radio resources omitting polling), the allocating unit 25 suspends polling to the MS 3. When not being notified that the transmission rate is equal to or higher than the maximum allowable rate (when not receiving a request for allocation of radio resources omitting polling), the allocating unit 25 continues polling and performs normal polling to inquire about whether allocation of radio resources is requested.

Figure 4:
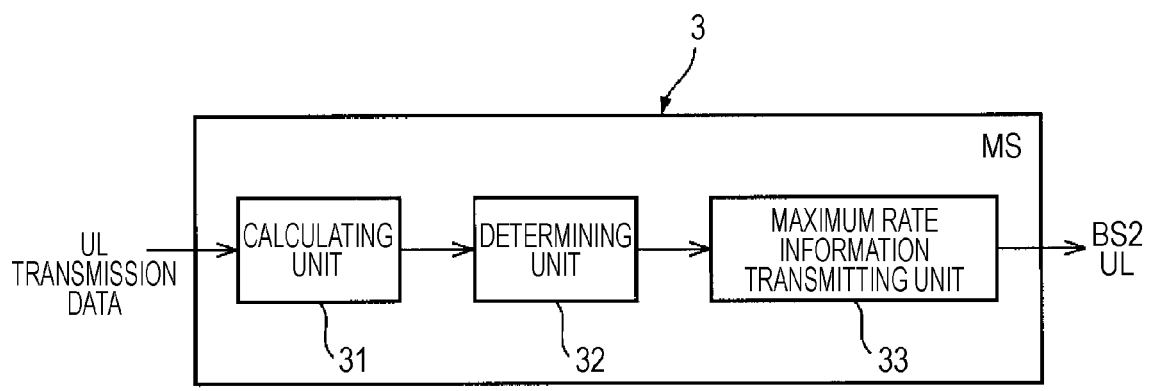
FIG. 4 is a block diagram illustrating an embodiment of a mobile station (MS) operating in conjunction with the BS illustrated in FIG. 3.

Next, the MS 3 is described. FIG. 4 is a block diagram illustrating an embodiment of the MS 3 that operates in conjunction with the BS 2 illustrated in FIG. 3. FIG. 4 illustrates the MS 3 in the radio communication system 1 that includes the BS 2 and the plurality of MSs 3 allocated with radio resources to accommodate data and transmitting UL data to the BS 2 by using the allocated radio resources. In the radio communication system 1, allocation of UL radio resources is performed based on polling by the BS 2 and a UL data transmission request (BR) from each MS 3 in response to the polling. As illustrated in FIG. 4, the MS 3 includes a calculating unit 31 to calculate a transmission rate of UL data to be transmitted to the BS 2, a determining unit 32 to determine whether the calculated transmission rate is equal to or higher than the maximum allowable rate, and a maximum rate information transmitting unit 33 to notify the BS 2 of rate information which indicates that the transmission rate of the MS 3 reaches to the maximum allowable rate when it is determined that the calculated transmission rate is equal to or higher than the maximum allowable rate. When being notified of the maximum rate information, the BS 2 suspends polling while continuing allocation of radio resources for UL data.

The method for allocating radio resources described above with reference to FIGS. 1 to 4 is realized also as a program executed by a computer. That is, a program for allocating UL radio resources allows the computer to execute calculating a transmission rate of UL data to be transmitted from each MS 3 to the BS 2, determining whether the calculated transmission rate is equal to or higher than the maximum allowable rate, suspending polling when it is determined that the transmission rate is equal to or higher than the maximum allowable rate, and continuously allocating radio resources for UL data while suspending the polling.

FIGS. 5A and 5B illustrate a state of transmission control between the BS 2 and the MS 3 according to an embodiment.

In FIGS. 5A and 5B, the BS 2 calculates a rate of UL data traffic based on a data size and transmission time intervals every time the BS 2 receives UL data from the MS 3, alternatively, every plurality of receptions or at predetermined intervals (P2 to P4 on the upper side in FIG. 5B). Steps S1 to S4 are the same as those described above with reference to FIG. 16B.

Then, the BS 2 determines whether the calculated UL rate is equal to or higher than the maximum allowable rate that has already been negotiated as a traffic parameter. If the UL rate is equal to or higher than the maximum allowable rate, the BS 2 omits transmission of polling, also omits allocation of a UL burst for a response to the polling, determines the size of UL burst for data transmission, and allocates radio resources (P5 to P7 on the upper side in FIG. 5B).

In the definition of the IEEE 802.16e, there is no clear distinction in the UL burst, e.g., for response to polling or for data transmission. In accordance with the size of UL burst allocated by the BS 2 based on the UL-MAP (FIG. 15), the MS 3 uses the UL burst for a BR message or for transmission of UL data. Thus, even if a UL burst for UL data transmission is allocated without polling, the MS 3 may transmit UL data.

Accordingly, polling may be omitted except in the case where polling is necessary. As a result, UL radio resources may be saved and a larger amount of radio resources may be used for transmitting user data. Also, the saved radio resources may be used for transmitting UL data from the MS or transmitting data from another MS.

FIGS. 6A and 6B illustrate a state of transmission control between the BS 2 and the MS 3 according to an embodiment.

In the example illustrated in FIGS. 5A and 5B, the BS 2 takes the initiative in the above-described transmission control. On the other hand, in the example illustrated in FIGS. 6A and 6B, the BS 2 and the MS 3 execute similar transmission control in conjunction with each other.

Specifically, the MS 3 calculates a rate of UL data traffic based on a data size and transmission time intervals every time the MS 3 transmits UL data to the BS 2.

Then, the MS 3 determines whether the calculated UL rate is equal to or higher than the maximum allowable rate that has already been negotiated as a traffic parameter. If the UL rate is equal to or higher than the maximum allowable rate, the MS 3 notifies the BS 2 of the determination result, that is, transmits a notification indicating a shift to UL radio resource allocation mode omitting polling (see the fourth arrow in P4 (from MS to BS) on the upper side in FIG. 6B). This notification may be transmitted in the form of a subheader added to a PDU (Protocol Data Unit) of transmission data.

The BS 2 that has received the notification omits (suspends) allocation of a UL burst for a response to polling and allocates a UL burst for UL data transmission (P5 to P7 on the upper side in FIG. 6B). The size of the UL burst for UL data transmission may be larger than the size of the UL burst allocated for a response to polling. Alternatively, the size may be the same or smaller. In this case, the size is larger so that a larger amount of data than that of a response to polling may be transmitted. Since the data is eventually transmitted, the radio resources may be saved by those for polling and transmission of a response to the polling.

As in the solving method illustrated in FIGS. 5A and 5B, the UL radio resources may be saved by omitting polling except in the case where polling is necessary, and a larger amount of radio resources may be used for transmitting user data.

FIG. 7 is a block diagram illustrating an example of a configuration of the BS 2. In FIG. 7, the BS 2 includes, as an interface for communication with the outside, a radio interface 46 that has an antenna ANT and that transmits/receives radio signals to/from the MS 3 and a network interface 41 that transmits/receives packets to/from a device, such as a router (not illustrated) in an upper network NW.

A DL packet addressed to the MS 3 received via the network interface 41 is identified by a packet identification/buffer unit 42 in units of MSs and connections, and is temporarily held as an SDU (Service Data Unit) in the buffer unit 42.

A scheduler 45 checks the user data held in the buffer unit 42 and allocates a slot in the DL subframe, so as to generate the DL-MAP (FIG. 15).

The SDU to which the slot has been allocated is processed: SDU/PDU conversion (MAC (Media Access Control) header and CRC (Cyclic Redundancy Check) are given, fragmentation, packing, etc.) is performed in a PDU generating unit 43; and encoding, modulation, and generation of a radio frame (FIG. 15) are performed in a transmission processing unit 44. Then, the PDU is converted to a radio signal by the radio interface 46 and is transmitted to the MS 3.

On the other hand, a UL data radio signal from the MS 3 received via the radio interface 46 is processed: extraction of a reception frame, demodulation, and decoding are performed in a reception processing unit 51, and sorting of a control message and user data is performed in an identifying unit 52.

PDU/SDU conversion (defragmentation, depacking, and removal of MAC header and CRC) is performed on the user data in an SDU reproducing unit 53, and the user data is transferred from the network interface 41 to the upper network NW side.

On the other hand, among control messages sorted in the identifying unit 52, the above-described BR message, which is a bandwidth allocation request from the MS 3, is transmitted to a bandwidth request managing unit 54 and is managed by the scheduler 45 as input information to determine scheduling of UL radio resources.

The scheduler 45 performs allocation of radio resources in the UL subframe in accordance with a bandwidth request of each connection managed by the bandwidth request managing unit 54, that is, the amount of UL data to be transmitted in the MS 3, and generates the UL-MAP (FIG. 15). This UL-MAP is broadcasted to the MSs 3 via the transmission processing unit 44.

The UL user data sorted in the identifying unit 52 is transferred to the SDU reproducing unit 53. At this time, a rate calculating unit 55 is notified of a connection identifier and a data size of the user data. The rate calculating unit 55 calculates an effective UL transmission rate of each connection based on the size of received user data and the reception time (frame number). For example, the rate calculating unit 55 may calculate a short-term UL transmission rate by dividing the size of data received at this time by the elapsed time from the previous reception of user data. Alternatively, the rate calculating unit 55 may calculate a moving average of the UL transmission rate based on the sizes of a plurality of pieces of data received previously and the reception times.

A determining unit 56 in the subsequent stage compares the UL transmission rate calculated by the rate calculating unit 55 in the above-described manner with the maximum allowable rate negotiated at establishment of connection (held in a memory as connection information 58) so as to determine whether the UL transmission rate is equal to or higher than the maximum allowable rate. If the UL transmission rate is equal to or higher than the maximum allowable rate, setting to omit (suspend) polling is performed to a polling managing unit 57.

The scheduler 45 that has received the setting refers to the connection information 58 and the polling managing unit 57 before deciding UL scheduling, and then performs normal (periodic) polling or allocation of radio resources for transmitting UL user data by omitting (suspending) the polling.

Figure 8:
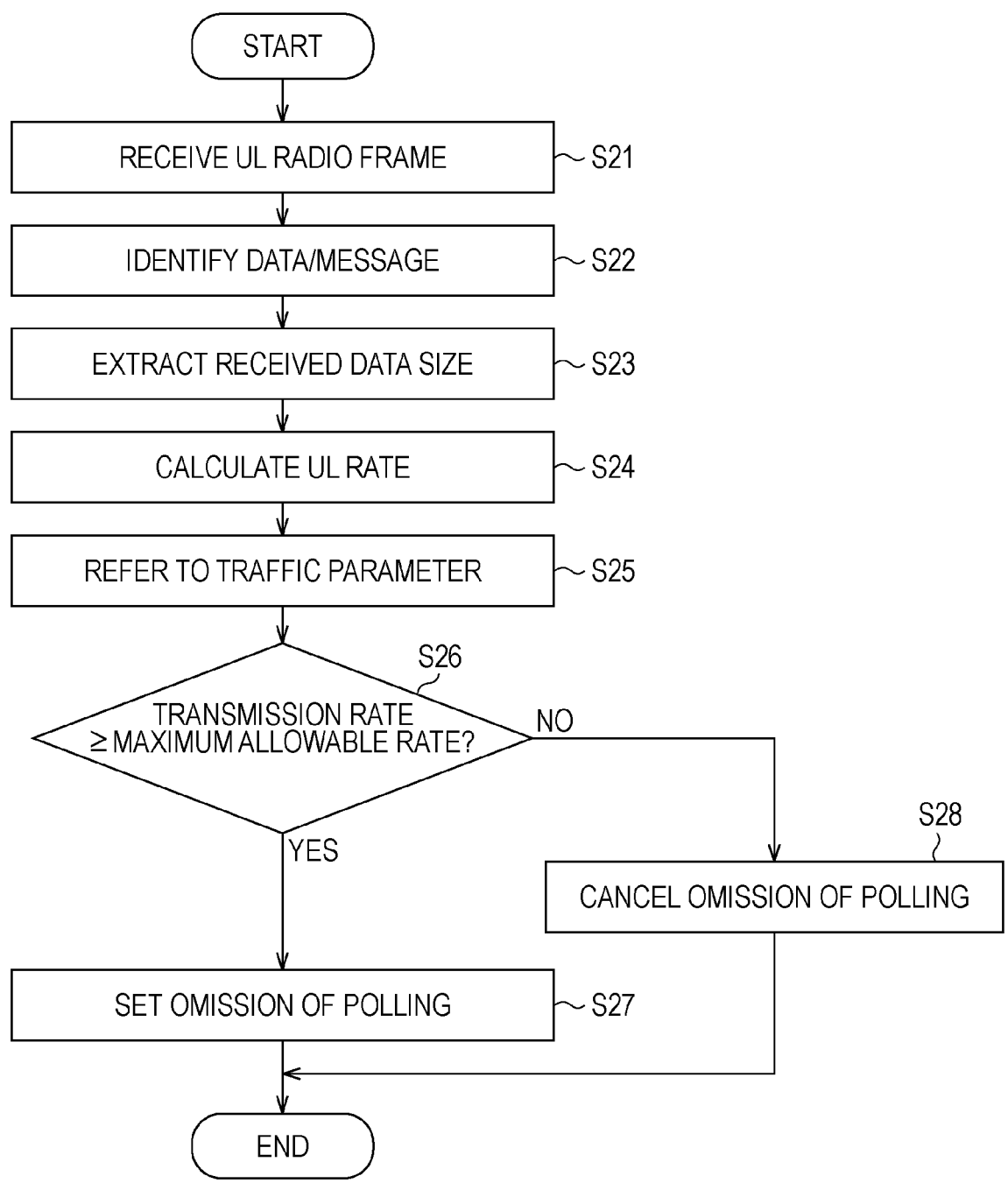
FIG. 8 is a flowchart illustrating a polling omitting (suspending) operation in the BS illustrated in FIG. 7.

FIG. 8 is a flowchart illustrating a polling omitting operation in the BS 2 illustrated in FIG. 7.

Step S21: The reception processing unit 51 receives a UL radio frame (FIG. 15).

Step S22: The identifying unit 52 identifies whether the frame is UL user data or a control message.

Step S23: The header of the identified UL user data PDU is analyzed and the size of the received data and a connection identifier are extracted.

Step S24: The transmission rate of the UL data from the MS 3 to the BS 2 is calculated based on the size of the received data, the current time, and the time of previous reception. The calculated transmission rate is input to the determining unit 56 together with the connection identifier.

Step S25: The determining unit 56 refers to the connection information 58 for the traffic parameter (maximum allowable rate) about the connection identified by the connection identifier.

Step S26: The determining unit 56 determines whether the calculated transmission rate of the UL data is equal to or higher than the maximum allowable rate.

Step S27: If the determination result in step S26 is YES, setting to omit (suspend) polling is performed on the polling managing unit 57.

Step S28: If the determination result in step S26 is NO, setting to omit (suspend) polling is canceled on the polling managing unit 57. In this way, even if omission of polling is set, the omission of polling may be canceled by this determination.

By receiving a request for cancellation added to the data transmitted from the MS during omission of polling and by detecting the request, the BS may cancel the omission of polling. At that time, the BS checks the content of data transmitted during omission of polling and determines whether the data includes a request for cancellation of omission of polling.

Figure 9:
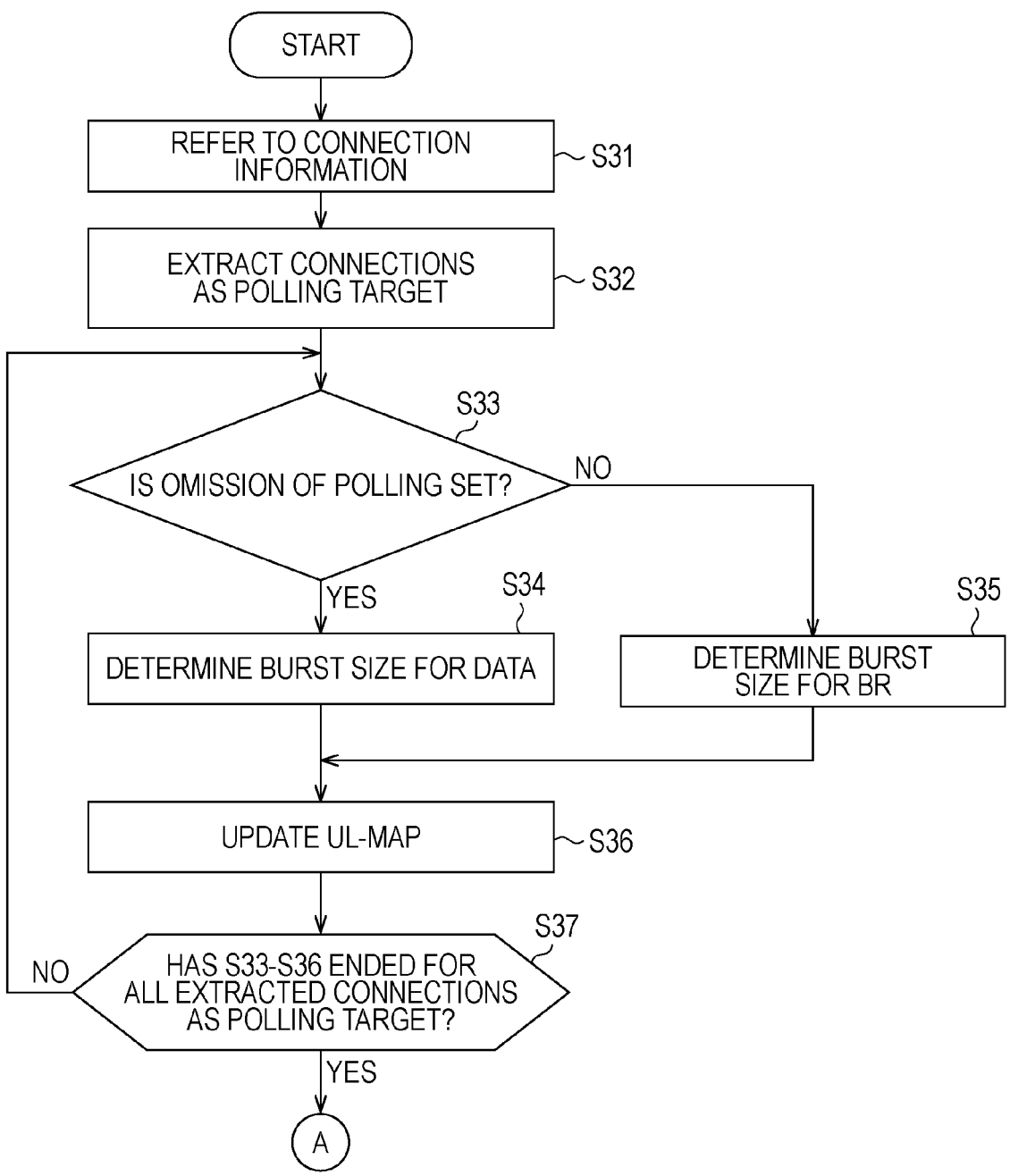
FIG. 9 is a first flowchart illustrating an uplink scheduling operation in the BS illustrated in FIG. 7.
Figure 10:
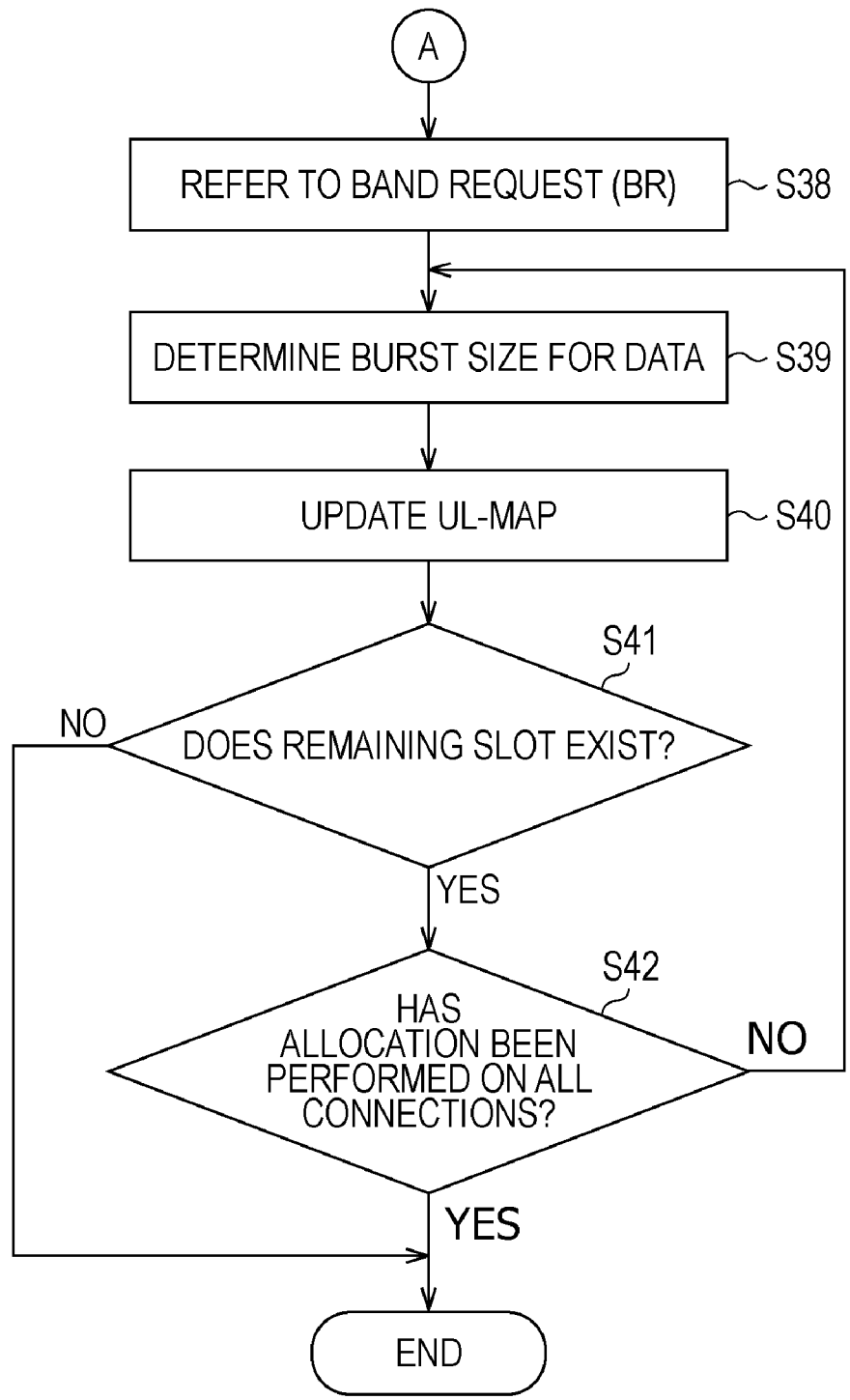
FIG. 10 is a second flowchart illustrating the uplink scheduling operation in the BS illustrated in FIG. 7.

FIG. 9 is a first flowchart illustrating a UL scheduling operation in the BS 2 illustrated in FIG. 7, and FIG. 10 is a second flowchart. S31 to S42 are steps in a process flow in the scheduler 45. This UL scheduling operation is executed for each frame together with DL scheduling. FIGS. 9 and 10 illustrate a scheduling flow about connection using the polling according to the embodiment.

The BS 2 performs setting of radio resources (transmission region) for control signal (channel) as ranging channel (Rs in FIG. 15) and scheduling of another connection which do not require polling process, in addition to the connection. However, such other scheduling operations are omitted in the flowcharts in FIGS. 9 and 10.

(a) Scheduling flow in view of omission (suspension) of polling based on the embodiment (steps S31 to S37)

Step S31: The time when polling was previously performed or the time when polling was previously omitted (suspended) in each connection is checked with reference to the connection information 58.

Step S32: The elapsed time from the previous polling (or omission of polling) to the present time is calculated, and the polling interval as a traffic parameter held as the connection information 58 is compared with the elapsed time. If the elapsed time is equal to the polling interval, the connection is extracted as a candidate connection on which polling is to be performed in the radio frame 4.

Step S33: Setting information about omission (suspension) of polling in the polling managing unit 57 is checked for each connection extracted in step S32 and it is determined whether omission (suspension) of polling is set.

Step S34: If the determination in step S33 is YES (omission (suspension) of polling is set), the size of UL burst for transmitting user data is determined. For example, the size may be determined by converting it to the amount of radio resources of the UL burst based on the number of bits obtained by multiplying the maximum allowable rate by the polling interval.

Step S35: If the determination in step S33 is NO (omission of polling is not set), the size of UL burst for polling is determined. The size is determined by converting it to the amount of radio resources of the UL burst based on 6 bytes, which is the size of the BR message.

Step S36: Based on the amount of radio resources determined in step S34 or S35, the radio resources on the UL subframe are allocated, a UL burst is generated, and the UL-MAP (FIG. 15) is updated. That is, the UL-MAP IE to define the generated UL burst is added.

Step S37: If the polling process of steps S33 to S36 has been performed on not all the candidate connections extracted as polling target in step S32, steps S33 to S36 are repeated for the unprocessed connections. If the polling process has been performed on all the candidate connections, a normal scheduling flow of allocating bursts for data (step S38 and the subsequent steps) is performed.

(b) Scheduling flow of allocating bursts for data based on a bandwidth request (BR) (steps S38 to S42)

Step S38: With reference to the bandwidth request managing unit 54, connections to which a UL burst is to be allocated are extracted in accordance with a BR message.

Step S39: The size of UL burst for transmitting user data is determined for each of the extracted connections. The size is determined by converting it to the amount of radio resources of the UL burst based on the size of the bandwidth request BR.

Step S40: The radio resources on the UL subframe are allocated based on the amount of radio resources determined in step S39, a UL burst is generated, and the UL-MAP is updated. That is, the UL-MAP IE to define the generated UL burst is added.

Step S41: Presence/absence of the remaining radio resources that can be allocated in the UL subframe is checked. If no radio resources remain, the scheduling process ends.

Step S42: It is determined whether allocation has been performed on all the connections extracted in step S38. If there is a connection on which allocation has not been performed, steps S39 to S40 are repeated.

Figure 11:
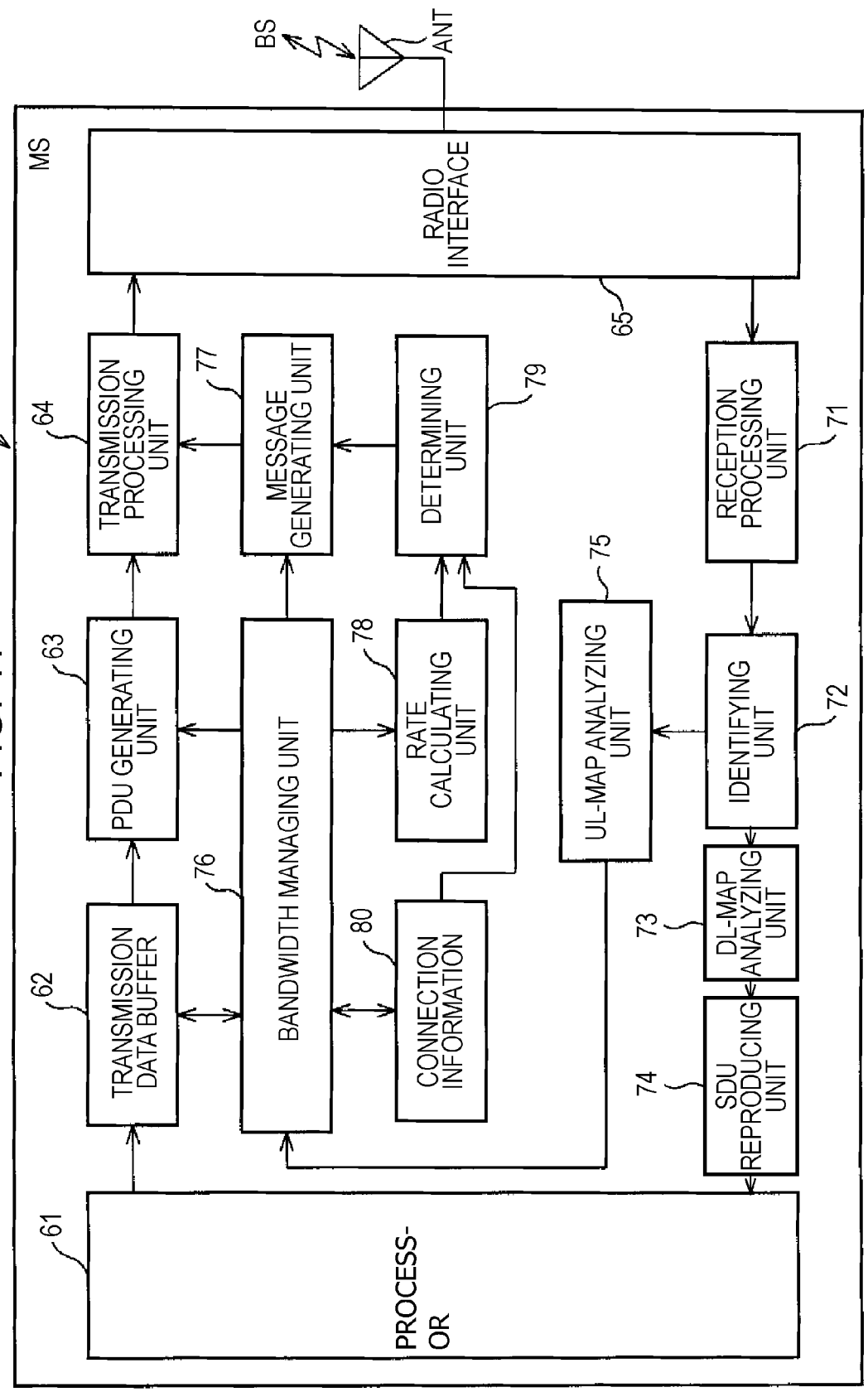
FIG. 11 is a block diagram illustrating a specific example of a configuration of the MS.

FIG. 11 is a block diagram illustrating an example of a configuration of the MS 3. In FIG. 11, the MS 3 includes, as an interface for communication with the outside, a radio interface 65 that includes an antenna ANT and that transmits/receives radio signals to/from the BS 2 and a processor 61 which executes various application programs used by a user.

The data generated by the processor 61 is temporarily held as an SDU (Service Data Unit) in a transmission data buffer unit 62. Then, after UL bursts have been allocated in the UL subframe based on the UL-MAP (FIG. 15) received from the BS 2, SDU/PDU conversion (MAC header and CRC are given, fragmentation, packing, etc.) is performed in a PDU generating unit 63; and encoding, modulation, and generation of a radio frame are performed in a transmission processing unit 64. Then, the PDU is converted to a UL data radio signal by the radio interface 65 and is transmitted to the BS 2.

On the other hand, a DL data radio signal from the BS 2 received via the radio interface 65 is processed: extraction of a reception frame, demodulation, and decoding are performed in a reception processing unit 71, and sorting of DL-MAP and UL-MAP is performed in an identifying unit 72.

In the case of DL user data, a DL-MAP analyzing unit 73 analyzes the DL-MAP and extracts a PDU from the DL burst storing the PDU addressed to the MS 3. Then, an SDU reproducing unit 74 performs PDU/SDU conversion (defragmentation, depacking, and removal of MAC header and CRC) and supplies the SDU to the processor 61.

On the other hand, the UL-MAP is analyzed by a UL-MAP analyzing unit 75 and is input to a bandwidth managing unit 76. The bandwidth managing unit 76 checks presence/absence of UL data to be transmitted in the transmission data buffer 62. If a UL burst is allocated by the UL-MAP, the bandwidth managing unit 76 instructs the PDU generating unit 63 to generate a PDU.

On the other hand, if no UL burst is allocated, a message generating unit 77 generates a BR message and requests allocation of a UL burst to the BS 2 via the transmission processing unit 64.

When UL user data is to be transmitted to the BS 2 based on instructions from the bandwidth managing unit 76, a rate calculating unit 78 is notified of the connection identifier and data size of the user data.

The rate calculating unit 78 calculates an effective UL transmission rate of each connection based on the size and transmission time (frame number) of the user data to be transmitted. For example, the rate calculating unit 78 may calculate a short-term UL transmission rate by dividing the size of data to be transmitted this time by the elapsed time from the previous transmission of user data. Alternatively, the rate calculating unit 78 may calculate a moving average of the UL transmission rate based on the sizes of a plurality of pieces of data transmitted previously and the transmission times.

A determining unit 79 in the subsequent stage compares the UL transmission rate calculated in the rate calculating unit 78 with the maximum allowable rate negotiated when the connection was established (held in the memory as connection information 80) and determines whether the UL transmission rate is equal to or higher than the maximum allowable rate. If the UL transmission rate is equal to or higher than the maximum allowable rate, the determining unit 79 requests generation of a message to notify the BS 2 of the fact to the message generating unit 77. This message may be transmitted to the BS 2 while being added to the UL transmission data PDU as a subheader or the like.

Figure 12:
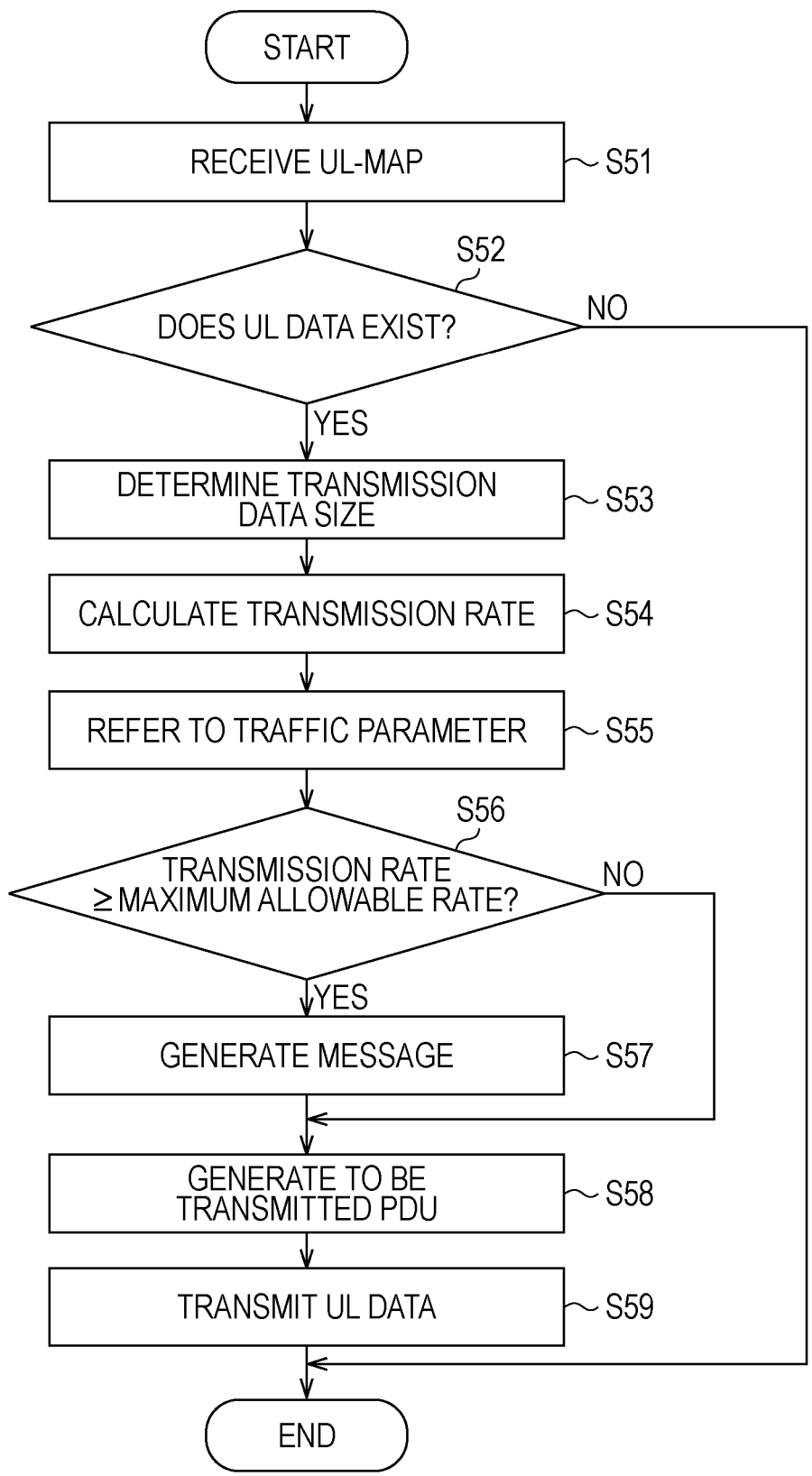
FIG. 12 is a flowchart illustrating a polling omitting (suspending) operation in the MS illustrated in FIG. 11.

FIG. 12 is a flowchart illustrating a polling omitting (suspending) operation in the MS 3 illustrated in FIG. 11.

Step S51: The reception processing unit 71 receives a DL radio frame. The identifying unit 72 extracts the UL-MAP from the received DL radio frame and supplies the UL-MAP to the bandwidth managing unit 76.

Step S52: The bandwidth managing unit 76 refers to the transmission data buffer 62 and checks whether there is UL user data to be transmitted.

Step S53: If the determination in step S52 is YES (there is UL data to be transmitted), the bandwidth managing unit 76 determines the size of UL data to be transmitted based on the size of the UL burst allocated in accordance with the UL-MAP. At this time, the bandwidth managing unit 76 notifies the rate calculating unit 78 of the identifier of the connection and the determined size of the data to be transmitted.

Step S54: The rate calculating unit 78 calculates the transmission rate of the UL data from the MS 3 to the BS 2 based on the size of the received data, the current time, and the time of the previous reception. The calculated transmission rate is input to the determining unit 79 together with the connection identifier.

Step S55: The determining unit 79 refers to the connection information 80 for the traffic parameter (maximum allowable rate) about the connection identified by the connection identifier.

Step S56: Furthermore, the determining unit 79 determines whether the calculated UL data transmission rate is equal to or higher than the maximum allowable rate.

Step S57: If the determination result in step S56 is YES, a message indicating that the transmission rate is equal to or higher than the maximum allowable rate is generated by the message generating unit 77.

Step S58: The PDU generating unit 63 generates a PDU to be transmitted. If the message indicating that the transmission rate is equal to or higher than the maximum allowable rate is generated in step S57, the message is added to the PDU generated here.

Step S59: The PDU generated in step S58 is transmitted to the BS 2 by using the radio resources on the UL subframe allocated in accordance with the UL-MAP.

Figure 13:
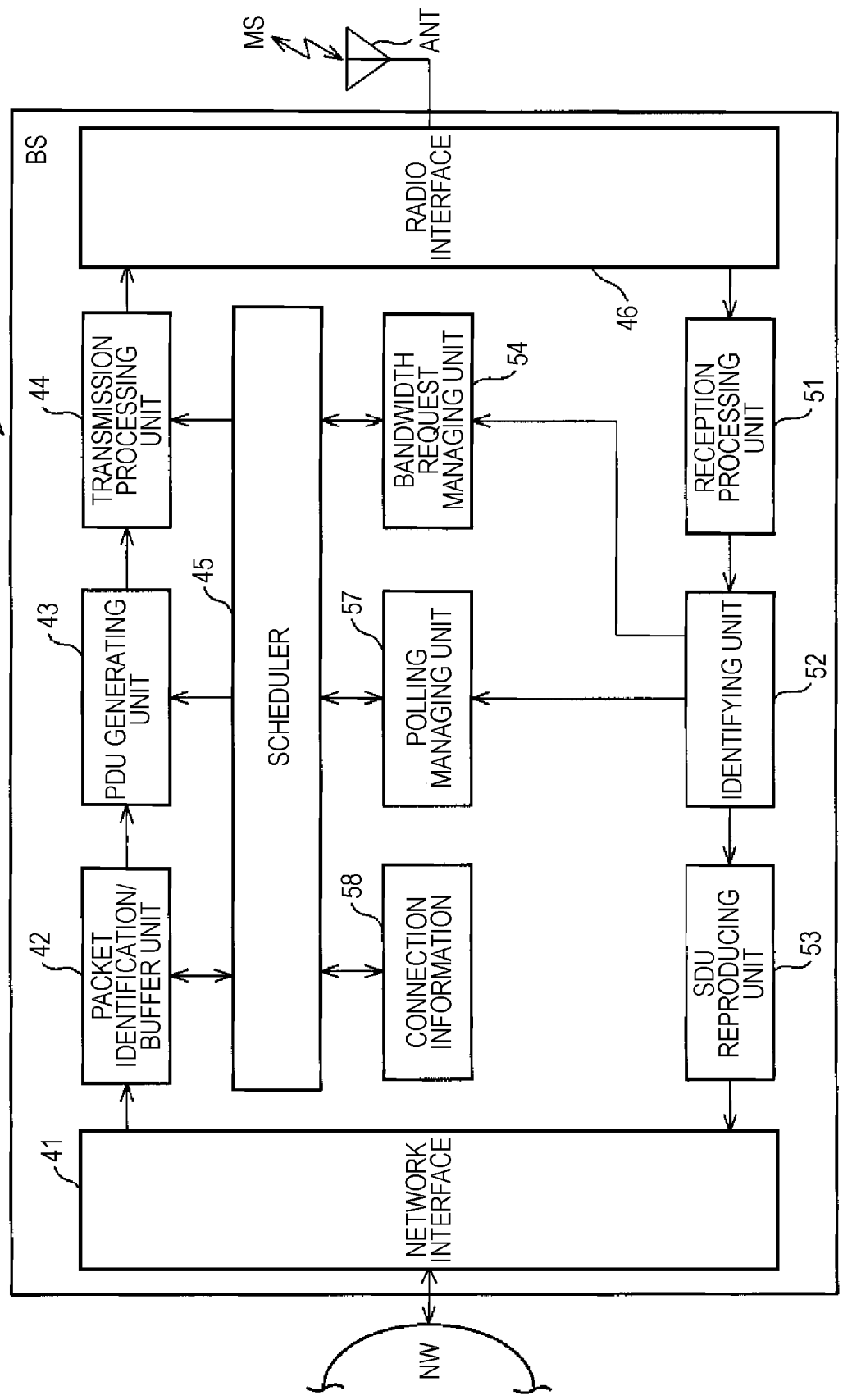
FIG. 13 is a block diagram illustrating an example of a configuration of the BS operating in conjunction with the MS illustrated in FIG. 11.

FIG. 13 is a block diagram illustrating an example of a configuration of the BS 2 that operates in conjunction with the MS 3 illustrated in FIG. 11. A different point from the configuration of the BS 2 illustrated in FIG. 7 is that the rate calculating unit 55 and the determining unit 56 are not provided. This is because the MS 3 illustrated in FIG. 11 determines whether the transmission rate is equal to or higher than the maximum allowable rate. If the transmission rate is equal to or higher than the maximum allowable rate, the MS 3 notifies the BS 2 of the fact through a maximum rate notification message, so that the BS 2 does not need to calculate the transmission rate and to determine whether the transmission rate is equal to or higher than the maximum allowable rate.

According to the above-described embodiments, usage efficiency of radio resources can be enhanced.

This enables improvement of the UL throughput of the entire system in the BS and guarantees a data transmission rate in respective UL connections.

On the other hand, in the MS, delay time due to wait for data transmission may be shortened and data loss due to buffer leakage may be reduced. Also, degradation of communication quality in an application that particularly requires a real-time performance, such as voice call or TV conference, may be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A method for allocating uplink radio resources to a radio communication device, the method comprising the steps of:
    transmitting, by a base station, a polling signal;
    allocating, by the base station, radio resources in accordance with receiving a bandwidth request which is transmitted from a mobile station in response to receiving the polling signal;
    determining, by the base station, whether a condition to omit transmitting the polling signal is satisfied;
    suspending, by the base station, transmitting the polling signal when the condition to omit transmitting the polling signal is satisfied; and
    allocating, by the base station, radio resources without receiving a bandwidth request from the mobile station while transmitting the polling signal is suspended.

2. The method for allocating uplink radio resources according to claim 1, the method further comprising
    calculating a transmission rate of uplink data to be transmitted from the mobile station to the base station,
    wherein the condition includes that the calculated transmission rate is equal to or higher than a maximum allowable rate.

3. The method for allocating uplink radio resources according to claim 2, wherein, when the calculated transmission rate is determined to be lower than the maximum allowable rate in the determining, transmitting the polling signal is not performed by the base station.

4. The method for allocating uplink radio resources according to claim 2, wherein the calculating and the determining are not performed by the base station, and
    wherein, when the calculated transmission rate is determined to be equal to or higher than the maximum allowable rate by the mobile station, a request for suspension of the polling signal is transmitted to the radio base station.

5. The method for allocating uplink radio resources according to claim 2, further comprising:
    counting a number of times when the calculated transmission rate is equal to or higher than a maximum allowable rate,
    wherein the condition includes that the number of times reaches a predetermined number of times.

6. The method for allocating uplink radio resources according to claim 1 further comprising the step of
    calculating, by the base station, of a transmission rate of uplink data to be transmitted from the mobile station to the base station.

7. The method for allocating uplink radio resources according to claim 1, wherein the suspending is continued until a number of the allocating reaches a predetermined number.

8. The method for allocating uplink radio resources according to claim 1, wherein the suspending is continued for a predetermined time from a time when the calculated transmission rate is equal to or higher than a maximum allowable rate.

9. The method for allocating uplink radio resources according to claim 1, wherein the radio resources for the data transmission are selected from radio resources including a radio resource obtained by the suspension of the polling signal transmission.

10. A radio base station used in a radio communication system that includes the radio base station and a plurality of mobile stations to transmit uplink data to the radio base station by being allocated with radio resources to accommodate data, the radio base station comprising:
    a polling unit to transmit a polling signal;
    an allocating unit to allocate radio resources in accordance with receiving a bandwidth request which is transmitted from one of the plurality of mobile stations in response to receiving the polling signal;
    a calculating unit to calculate a transmission rate of uplink data received from each of the mobile stations; and
    a determining unit to determine whether the calculated transmission rate is equal to or higher than a maximum allowable rate;
    wherein
        the polling unit suspends transmission of the polling signal when the transmission rate is determined to be equal to or higher than the maximum allowable rate; and
        the allocating unit allocates radio resources for the uplink data without receiving a bandwidth request from the one of the plurality of mobile stations, while transmission of the polling signal is suspended.

11. The radio base station according to claim 10, wherein the polling unit performs the polling to the mobile stations when the calculated transmission rate is lower than the maximum allowable rate.

12. The radio base station according to claim 10, wherein the allocated radio resources are selected from radio resources including a radio resource obtained by suspending the polling, while the transmission of the polling signal is suspended.

13. A radio base station used in a radio communication system that includes the radio base station and a plurality of mobile stations to transmit uplink data to the radio base station by being allocated with slots to accommodate data, the radio base station comprising:
    a polling unit to transmit a polling signal;

an allocating unit to allocate radio resources in accordance with receiving a bandwidth request which is transmitted from one of the plurality of mobile stations in response to receiving the polling signal; and an information receiving unit to receive notification information that is transmitted from each of the mobile stations when it is determined that a transmission rate of uplink data calculated in the mobile station is equal to or higher than a maximum allowable rate;

wherein the polling unit suspends transmission of the polling signal when the transmission rate is determined to be equal to or higher than the maximum allowable rate; and the allocating unit allocates radio resources for the uplink data without receiving a bandwidth request from the one of the plurality of mobile stations, while the transmission of the polling signal is suspended.

14. The radio base station according to claim 13, wherein the polling unit performs the polling to the mobile stations when not being notified that the calculated transmission rate is equal to or higher than the maximum allowable rate.

15. The radio base station according to claim 13, wherein the allocated radio resources are selected from radio resources including a radio resource obtained by suspending the polling, while the transmission of the polling signal is suspended.

* * * * *